Feb. 16, 1960 R. J. HANCOCK 2,925,206
EGG CASE
Filed March 13, 1957 2 Sheets-Sheet 1

Ralph J. Hancock
INVENTOR.

BY
Attorneys

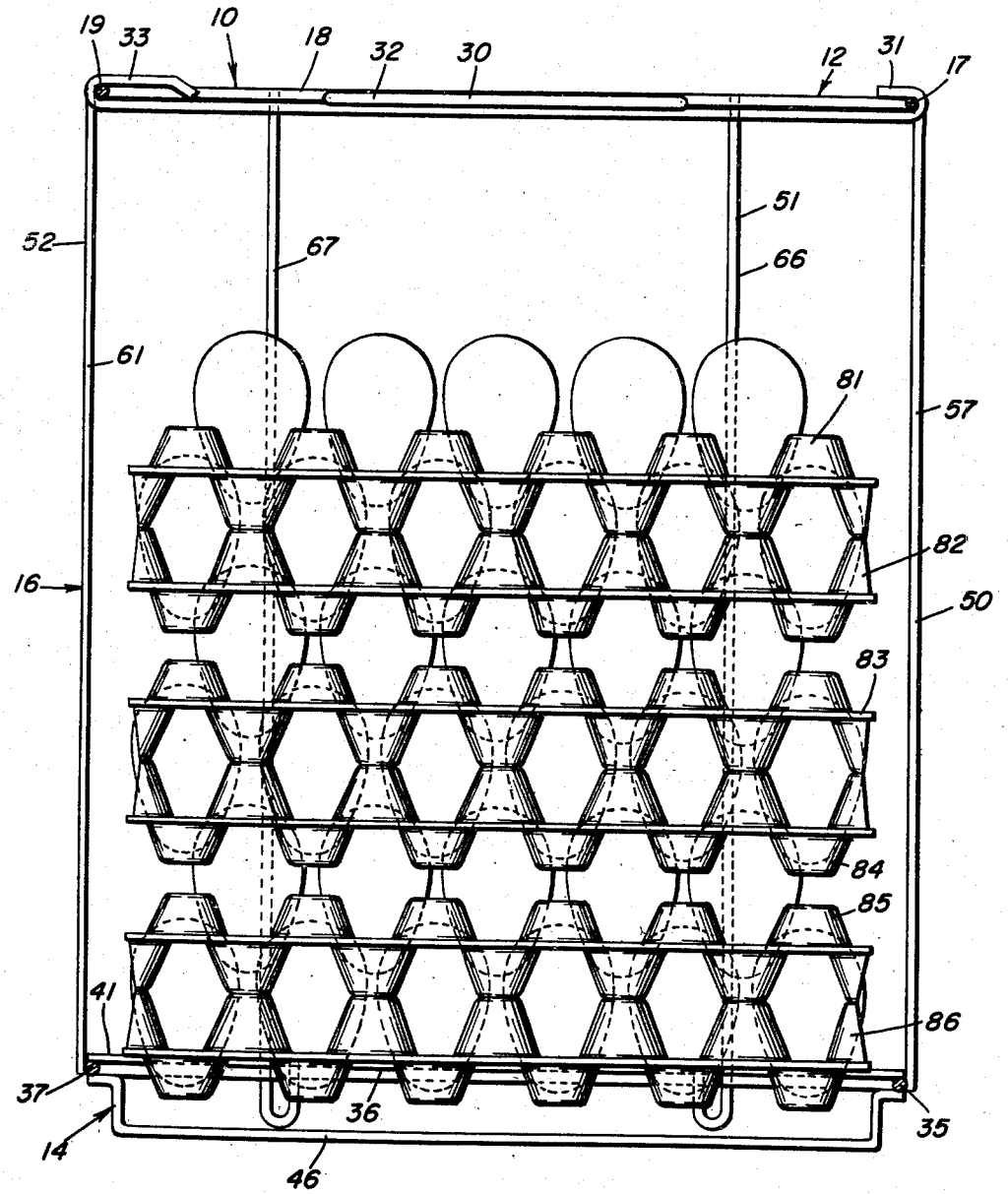

United States Patent Office 2,925,206
Patented Feb. 16, 1960

2,925,206

EGG CASE

Ralph J. Hancock, Marietta, Ga.

Application March 13, 1957, Serial No. 645,693

4 Claims. (Cl. 224—45)

This invention relates to improvement in means for handling and displaying eggs and more particularly to a novel case by which eggs are both handled and displayed.

An object of the invention is to provide a case of unique construction by which gathering eggs in a hen house is facilitated inasmuch as the case exemplifying the principles of the invention neatly accommodates egg filler flats and yet in the processing of eggs for grade and packaging, the eggs may be applied in cartons guided by the case. This provides for the handling of eggs either on a packaged or a loose basis.

A further object of the invention is to provide a specially designed egg case which is lightweight and which has a great number of uses, such as those mentioned above, and in making store deliveries. A single case may be held in each hand in order to improve the balance for the deliveryman. There is considerable maneuverability by handling the eggs in this way so that it is easier to handle the eggs either in the hen house, processing or loading and unloading in delivering eggs.

A further object of the invention is to provide a case as described above wherein it is capable of being used with push forks or other mechanical handling equipment. This is achieved by having a skid under each case, providing the necessary minimum clearance for the fork attachment on a hand truck. Even with this, the cases are arranged so that they are capable of being stacked, and in stacking the cases interlock.

Although the case for handling the eggs is functional, as described above and as will become apparent to those skilled in the art in following the subsequent description of the illustrated embodiment of the invention, it is so constructed that the eggs either loose (on filler flats) or in cartons are completely vendable, since they are easily extracted by the customer when the case is used as a display rack.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a transverse, sectional view as it would appear when looking on the line 2—2 of Figure 1, there being a plurality of filler flats with eggs thereon disposed in the egg case;

Figure 1:
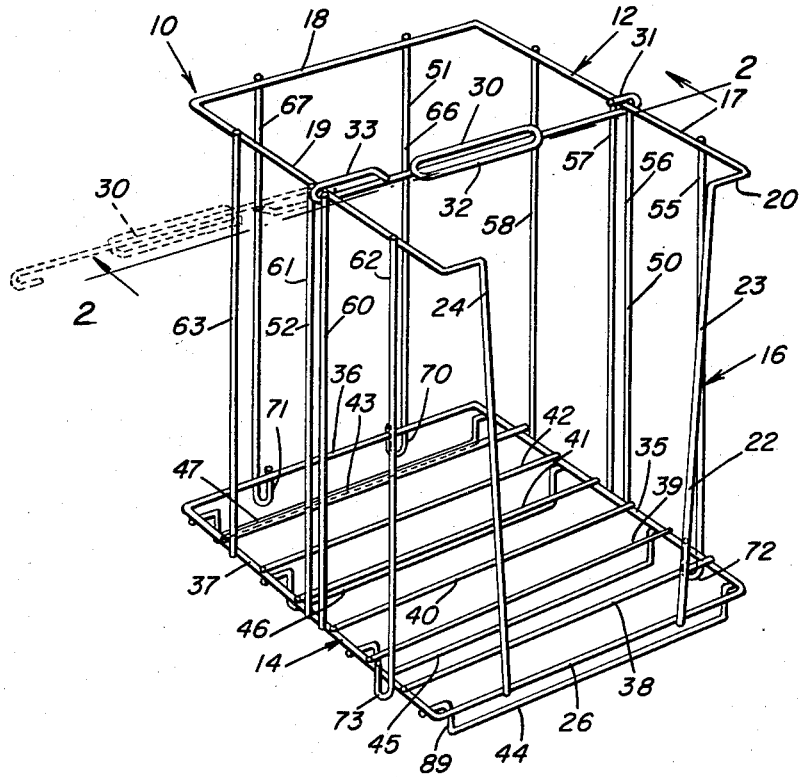
Figure 1 is a perspective view of a case which is constructed in accordance with the invention.
Figure 4:
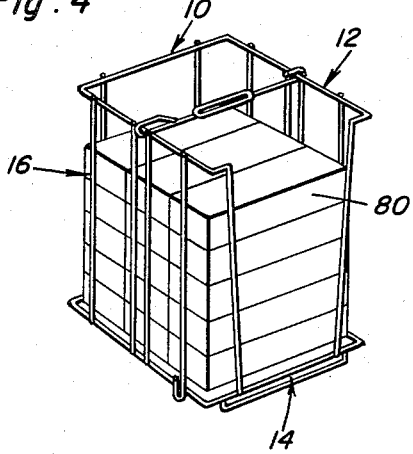
Figure 4 is a perspective view of the egg case showing the same to be used with packaged eggs, for example, as would be used in a store.
Figure 3:
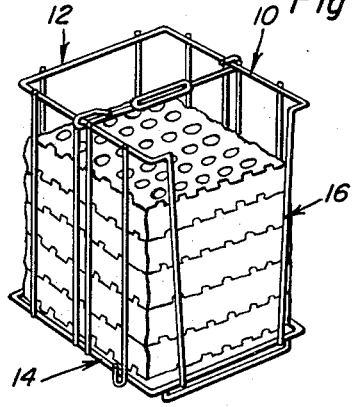
Figure 3 is a perspective view of an egg case of the invention as it would appear when used for display purposes in a store and when the eggs are being handled on a loose basis.

Figures 3 and 4 showing in addition to the specific uses mentioned various other possible uses, such as the cases in readiment for use by the deliveryman, for stacking, for transportation, for storage, etc.

In the accompanying drawings, there is an egg case 10 which is constructed to exemplify the principles of the invention. This egg case is made completely of wire, and it is presently contemplated to use a lightweight metal wire, although other materials may be adopted. The case 10 is constructed of three principal sections, namely: the upper section 12, the bottom or lower section 14 and the side walls or intermediate sections 16. Upper section or top 12 has three side members 17, 18 and 19 and a front member 20 that has a large frontal opening. The front side wall 22 of case 10 is made of two wire members 23 and 24 which extend downwardly and they converge slightly toward the bottom 14. They are secured at their lower extremities to the front member 26 of bottom 14 and are joined integrally at their upper edges to the confronting ends of front 20.

A carrying handle and support 30 is formed with an inwardly opening hook 31 at one end and an intermediate loop 32 and, finally, at the other end a hinge loop 33. The hinge loop encircles a part of the side member 19 and the hook 31 embraces an intermediate part of the side member 17. In order to release the carrying handle 30 for access to the interior of the case from the open top thereof, the side walls of the case are flexed together slightly and hook 31 released. The reverse procedure is carried out to attach the handle 30.

The bottom or base 14 is made of a rectangular frame having the previous mentioned side member 26, together with side members 35, 36 and 37, respectively. Cross members 38, 39, 40, 41, 42 and 43 are spot welded or otherwise attached at their ends to the sides 35 and 37 and they form the support for the egg filler flats or cartons. Supports 44, 45, 46 and 47 for the case each have right angular offsets at the ends which are attached to the side member 35 and 36, thereby spacing the rectangular frame of base 14 from the ground, floor or other supporting surface to enable a hand truck fork to fit easily thereunder.

The four sides 22, 50, 51 and 52 are made of rigidly attached wire members extending from the top 12 to the bottom 14 of the egg case. Side wall 22 has been previously described and is made of members 23 and 24. Side wall 50 is the same as side wall 52, consisting of four upright side members 55, 56, 57 and 58, respectively. Members 56 and 57 are close to each other and are at about the center of the side wall 50. Latch hook 51 is adapted to be inserted between members 56 and 57, while the hinge eye 53 is between corresponding members 60 and 61 of side 52. The flanking members 62 and 63 correspond to the members 55 and 58. The back side wall 51 is made of two wire members 66 and 67, which, like the members 62 and 55, have U-shaped lower ends 70 and 71. The U-shaped lower ends 72 and 73 on members 55 and 62 cooperate therewith in order to prevent lateral sliding between stacked cases and also to function as feet.

The use of the egg case has been indicated previously. The two principal uses of the case will be in connection with loose eggs (Figures 2 and 3) or with eggs in packages 80 (Figure 4). Packaged eggs are apparent in their application to the case, and from inspection of Figure 2, eggs on a loose basis are equally as apparent. The ordinary filler flats 81, 82, 83, 84, 85 and 86 respectively that are illustrated in Figure 2 stack with the eggs supported in the pockets thereof.

In those instances where it is desired to stack the cases, the angular offsets 89 at each end of each support 44, 45, 46 and 47 nest within the open top 12 of the lower case and U-shaped ends 70, 71, 72 and 73 fit on the outside surface of the sides 17, 18 and 19 of the top 12. In such a case, the carrying handle 30 is swung to an inoperative hanging position between members 60 and 61.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An egg case for multiple purpose use, said case being constructed of wire and having an open multi-sided top frame, a base which is also multi-sided and which has transverse members on which to support the egg holding devices such as egg fillers and cartons, supports for the egg case secured to two of the sides of the base and having angularly offset ends whereby to elevate the bottom of the case, said supports being sufficiently narrow to fit within the open top of another similarly constructed case, and feet protruding downwardly from the bottom of said case and adapted to engage the outside surface of said other similarly constructed case when stacked thereon.

2. In a multi-purpose case, an upper section and a lower section, said lower section being constructed of a frame on which to support filler flats or cartons, a plurality of side members extending from said base, an upper open frame to which said side members are secured, a substantially open front on said case but having two slightly inclined members by which to prevent separation of the filler flates or cartons from the case, a plurality of supports for the case attached to said base and inset at the ends thereof, members depending below said base and coacting with the inset parts of said supports to form clamps by which a lower case may be prevented from laterally sliding when stacked therewith.

3. In a multi-purpose case, an upper section and a lower section, said lower section being constructed of a frame on which to support filler flats or cartons, a plurality of side members extending from said base, an upper open frame to which said side members are secured, a substantially open front on said case but having two slightly inclined members by which to prevent separation of the filler flats or cartons from the case, a plurality of supports for the case attached to said base and inset at the ends thereof, members depending below said base and coacting with the inset parts of said supports to form clamps by which a lower case may be prevented from laterally sliding when stacked therewith, a transverse carrying handle movably connected to the upper end of the case, and a latch releasably retaining the carrying handle in the closed position over the normally open top of the case.

4. In a multipurpose case, an upper section and a lower section, said lower section being constructed of a frame on which to support filler flats or cartons, a plurality of side members extending from said base, an upper open frame to which said side members are secured, a substantially open front on said case but having two slightly inclined members by which to prevent separation of the filler flats or cartons from the case, a plurality of supports for the case attached to said base and inset at the ends thereof, one of said supports being disposed adjacent the rear of said base, a plurality of feet projecting downwardly from said base and disposed on the exterior of the latter whereby clamps are formed by said feet and said supports by which a lower case may prevent an upper case from lateral or longitudinal sliding when stacked therewith.

References Cited in the file of this patent

UNITED STATES PATENTS

| 643,492 | Fromholz | Feb. 13, 1900 |
| 1,202,148 | Bartlett | Oct. 24, 1916 |
| 1,660,410 | Beckman | Feb. 28, 1928 |
| 2,554,232 | Young | May 22, 1951 |
| 2,585,428 | Bitney | Feb. 12, 1952 |
| 2,790,556 | Burt | Apr. 30, 1957 |

FOREIGN PATENTS

| 14,915 | Great Britain | 1904 |
| 911,957 | Germany | May 20, 1954 |